No. 11,993. Reissued May 20, 1902.

W. THURMAN.

CUFF HOLDER.

(Application filed Apr. 9, 1902.)

Inventor
William Thurman,

Witnesses
Chas. Roach.
A. G. Heyhman.

By Victor J. Evans,
Attorney

THE NORRIS PETERS CO., PHOTO-LITHO., WASHINGTON, D. C.

UNITED STATES PATENT OFFICE.

WILLIAM THURMAN, OF NEWKIRK, OKLAHOMA TERRITORY.

CUFF-HOLDER.

SPECIFICATION forming part of Reissued Letters Patent No. 11,993, dated May 20, 1902.

Original No. 681,279, dated August 27, 1901. Application for reissue filed April 9, 1902. Serial No. 102,135.

*To all whom it may concern:*

Be it known that I, WILLIAM THURMAN, a citizen of the United States, residing at Newkirk, in the county of Kay and Territory of Oklahoma, have invented new and useful Improvements in Cuff-Holders, of which the following is a specification.

My invention relates to cuff-holders; and its object is to provide a device of this character which may be cheaply constructed and will be secure and effective in use and adapted to be quickly fastened and unfastened.

The invention consists in a fastener of novel construction for securing a cuff to the sleeve of a shirt, and the details thereof will be fully described hereinafter in connection with the accompanying drawings, which form part of this specification, and its novel features defined in the appended claim.

Figure 1:
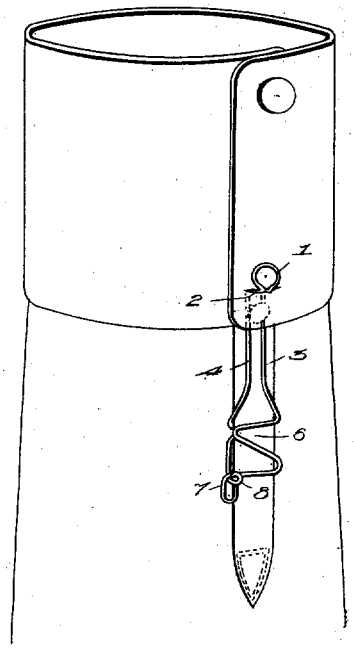
Figure 2:
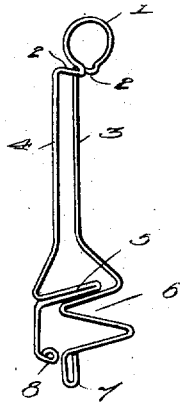

In the drawings, Figure 1 is a view in perspective of a cuff secured to a shirt-sleeve by my improved fastener, and Fig. 2 is a perspective view of the fastener detached.

The fastener is formed from a single piece of resilient wire bent upon itself to form a loop or eye 1, then laterally to form the arms 2, then at approximately right angles to form diverging arms 3 and 4. The short arms 2 project the loop 1 away from or out of the plane of the arms 3 and 4, thus adapting said loop to be passed through the buttonholes of a cuff and the arms 3 and 4 to engage the button of the wristband of the sleeve, as is clearly illustrated in Fig. 1. The ends of the diverging arms 3 and 4 are bent inward at substantially right angles and then outward to form overlapping bends 5 and 6 and are then turned downward, as shown in Fig. 2, one member terminating in a loop 7 and the other in a head or hook 8, adapted to engage the loop 7 to connect the two members.

The utility and operation of the device will be readily understood from the illustration and may be explained as follows: The loop 1 is inserted through the buttonholes of the cuff and the bend 5 rests on the inner side of the overlapping edge of the sleeve, while the bend 6 rests upon the outer side thereof. The hook or head 8 of the arm 4 is then engaged with the loop 7 to secure the two resilient arms 3 and 4 together.

It will be obvious that the sleeve is firmly clamped between the two spring members of the fastener and that the cuff is thus securely held in position, but may be adjusted longitudinally of the sleeve to project the front edge of the cuff forward to any desired extent.

As the fastener is made from a single piece of spring wire, it may be manufactured at a trifling cost and affords a very simple and effective means for attaching the cuff to the shirt-sleeve.

I claim—

A cuff-holder comprising a single piece of resilient wire bent to form a loop and diverging arms, the loop being offset from the plane of said arms, inwardly-projecting overlapping bends in said arms, constituting clamps to engage the shirt-sleeve, a loop at the end of one of said arms and a head at the end of the other arm for connecting said arms detachably.

In testimony whereof I affix my signature in presence of two witnesses.

WILLIAM THURMAN.

Witnesses:

R. S. SHANER,

A. L. ZORK.